US005836845A

United States Patent [19]
Sakaguchi et al.

[11] Patent Number: 5,836,845
[45] Date of Patent: Nov. 17, 1998

[54] HYDRAULIC PRESSURE CONTROL APPARATUS FOR AN AUTOMATIC TRANSMISSION

[75] Inventors: Shinya Sakaguchi, Kariya; Akira Takagi, Obu, both of Japan

[73] Assignee: Denso Corporation, Kariya, Japan

[21] Appl. No.: 869,986

[22] Filed: Jun. 5, 1997

[30] Foreign Application Priority Data

Jun. 6, 1996 [JP] Japan .................................. 8-144337
Mar. 18, 1997 [JP] Japan .................................. 9-064964

[51] Int. Cl.[6] ................................................ F16H 61/00
[52] U.S. Cl. ........................................ 475/131; 475/127
[58] Field of Search ..................................... 475/127, 131

[56] References Cited

U.S. PATENT DOCUMENTS

| 4,903,551 | 2/1990 | Hiramatsu et al. . | |
|---|---|---|---|
| 5,010,786 | 4/1991 | Hiramatsu et al. . | |
| 5,121,656 | 6/1992 | Baba et al. ............................. | 475/131 |
| 5,492,523 | 2/1996 | Leonard ................................. | 475/131 |
| 5,643,125 | 7/1997 | Long et al. ............................ | 475/127 |

FOREIGN PATENT DOCUMENTS

| 64-035151 | 2/1989 | Japan . |
|---|---|---|
| 3-163265 | 7/1991 | Japan . |
| 7-280079 | 10/1995 | Japan . |
| 7-293686 | 11/1995 | Japan . |
| 7-293694 | 11/1995 | Japan . |

*Primary Examiner*—Dirk Wright
*Attorney, Agent, or Firm*—Pillsbury Madison and Sutro LLP

[57] ABSTRACT

Hydraulic pressure applied to an LR/B is controlled by a first solenoid valve when a forward-movement range is selected, and is controlled by a second solenoid valve when a backward-movement range is selected. In addition, in the forward-movement range, the second solenoid valve controls hydraulic pressure applied to an OD/C which couples at a different gear position from the LR/B. When both solenoid valves fall into non-excitation states due to the breaking of an electric signal line, the failure of an AT ECU or the like, the output hydraulic pressures of the solenoid valves is held high and low, respectively. Therefore, even in this case, double coupling of the LR/B and the OD/C can be prevented in the forward-movement range as well as a predetermined gear position can be established in each of the forward-movement range and the backward-movement range.

5 Claims, 7 Drawing Sheets

|     | R/C | 2ND/B | OD/C | UD/C | LR/B |
|-----|-----|-------|------|------|------|
| R   | ○   |       |      |      | ○    |
| P,N |     |       |      |      |      |
| 1   |     |       |      | ○    | ○    |
| 2   |     | ○     |      | ○    |      |
| 3   |     |       | ○    | ○    |      |
| 4   |     | ○     | ○    |      |      |

FIG. 12

HYDRAULIC PRESSURE CONTROL APPARATUS FOR AN AUTOMATIC TRANSMISSION

BACKGROUND OF THE INVENTION

1. Field of the Invention

The present invention relates to a hydraulic pressure control apparatus for an automatic transmission, which regulates hydraulic pressure to control a gear shift mechanism including a plurality of friction coupling elements of an automatic transmission.

2. Related Art

Conventionally, in an automatic transmission utilized for a vehicle or the like, gear shift control is performed by switching and regulating hydraulic pressure applied to each of friction coupling elements in the automatic transmission by hydraulic pressure control valves, to smoothly transmit rotational driving power corresponding to loads. In detail, gear shift control is performed based on a manual operation of a shift lever by a driver, which selects one of forward gears, a neutral gear and a backward gear, and an automatic operation performed by an automatic transmission control computer (hereinafter, referred to as "AT ECU") in response to an opening degree of a throttle valve of an engine and the like. In the automatic operation, each of the friction coupling elements is controlled in a coupling state or a releasing state so that an appropriate gear ratio can be obtained.

Japanese Patent Application Laid-open No. 63-210443 discloses a hydraulic pressure control apparatus for an automatic transmission as described above. In the hydraulic pressure control apparatus disclosed by JP-A-63-210443, hydraulic pressure applied to a low/reverse brake, which is turned in a coupling state when a vehicle moves forward and backward, is controlled by a single solenoid valve.

Hydraulic fluid from the solenoid valve is provided to the low/reverse brake via a spool valve as a change-over valve for fail-safe use. Hydraulic pressure applied to the low/reverse brake is properly controlled by the solenoid valve and the spool valve when a gear position of the automatic transmission is shifted.

If the solenoid valve is in a non-operated state due to a breaking of an electric signal transmission line, a failure of the ECU or the like, hydraulic pressure from the solenoid valve is fixed to high pressure. In the non-operated state of the solenoid valve, if the backward gear is selected, the spool valve chooses high pressure provided by the solenoid valve and supplies high pressure to the low/reverse brake to hold the gear position at the backward gear. On the other hand, if one of the forward gears is selected, the spool valve chooses low pressure instead of high pressure provided by the solenoid valve to keep the gear position of a third position. In this way, due to the fact that the spool valve changes hydraulic pressure applied to the low/reverse brake during the non-operated state of the solenoid valve, the spool valve enables the vehicle to move forward and backward.

However, because the spool valve is a change-over valve operated by hydraulic pressure, the spool valve can be locked due to biting of an extraneous material or the like. In the non-operated state of the solenoid valve, because hydraulic pressure provided by the solenoid valve is fixed to high pressure, if the spool valve is locked, high hydraulic pressure is provided to the low/reverse brake when one of the forward gears is selected. As a result, double coupling of the friction coupling elements occurs.

SUMMARY OF THE INVENTION

The present invention has been made in view of such problems, and its object is to provide a hydraulic pressure control apparatus for an automatic transmission which can prevent double coupling of friction coupling elements and can allow a vehicle to move forward and backward even when both first and second pressure control devices fall in a non-operated state.

The hydraulic pressure control apparatus for an automatic transmission according to the present invention has a first pressure control device provides low hydraulic pressure during its non-operated state and a second pressure control device provides high hydraulic pressure during its non-operated state. The automatic transmission comprises a first friction coupling element which is set into a coupling state when a vehicle moves forward and backward, and a second friction coupling element which is set into a coupling state when the vehicle moves forward with a gear position different from that when the first friction coupling element is coupled. A changing device changes a hydraulic pressure supplying source for the first friction coupling element so that the first pressure control device controls hydraulic pressure applied to the first friction coupling element when the vehicle moves forward and the second control device controls hydraulic pressure applied thereto when the vehicle moves backward. The second pressure control device also controls hydraulic pressure applied to the second friction coupling element to cause the vehicle to move forward with the gear position different from that when the first friction coupling element is coupled.

As a result, high hydraulic pressure from the second pressure control device is supplied to the first friction coupling element during backward-movement of the vehicle. Therefore, not only an occurrence of double coupling of the first and second friction coupling elements can be prevented when the vehicle moves forward, but also the vehicle can moves forward and backward. In the forward-movement of the vehicle, when the first and second pressure control devices fall into the non-operated states, the vehicle moves forward with the gear position obtained by the coupling of the second friction coupling element.

Preferably, the changing device comprises a manual valve interlocking with a shift lever operated by a driver. In this case, the supply of hydraulic pressure from the second pressure control device is reliably switched between the first friction coupling element or the second friction coupling element by the manual valve.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

PREFERRED EMBODIMENTS OF THE INVENTION

A Preferred embodiment of the present invention will be described with reference to the drawings.

Figure 1:
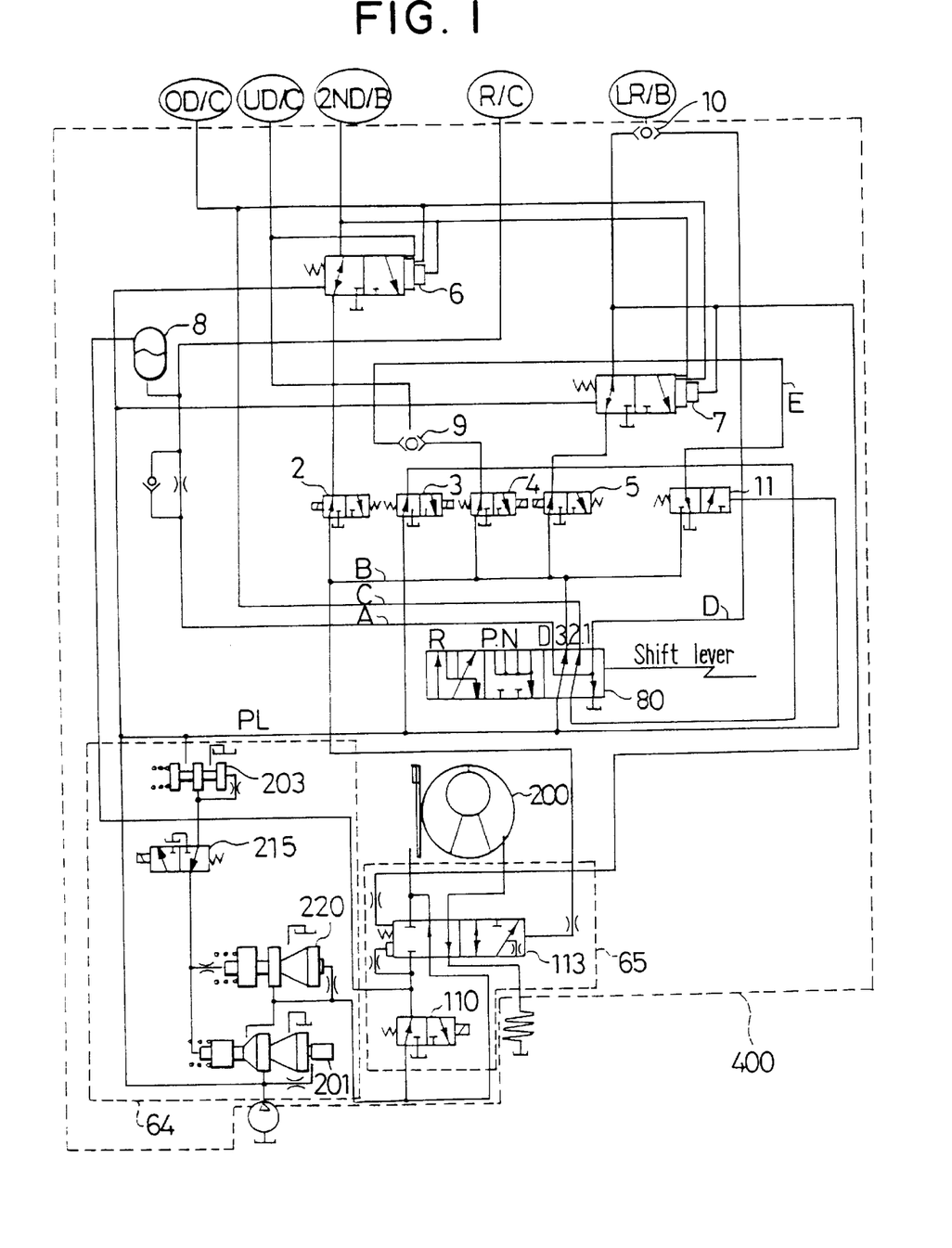
FIG. 1 is a schematic hydraulic circuit diagram of a hydraulic pressure control apparatus according to a first embodiment of the present invention.
Figure 2:
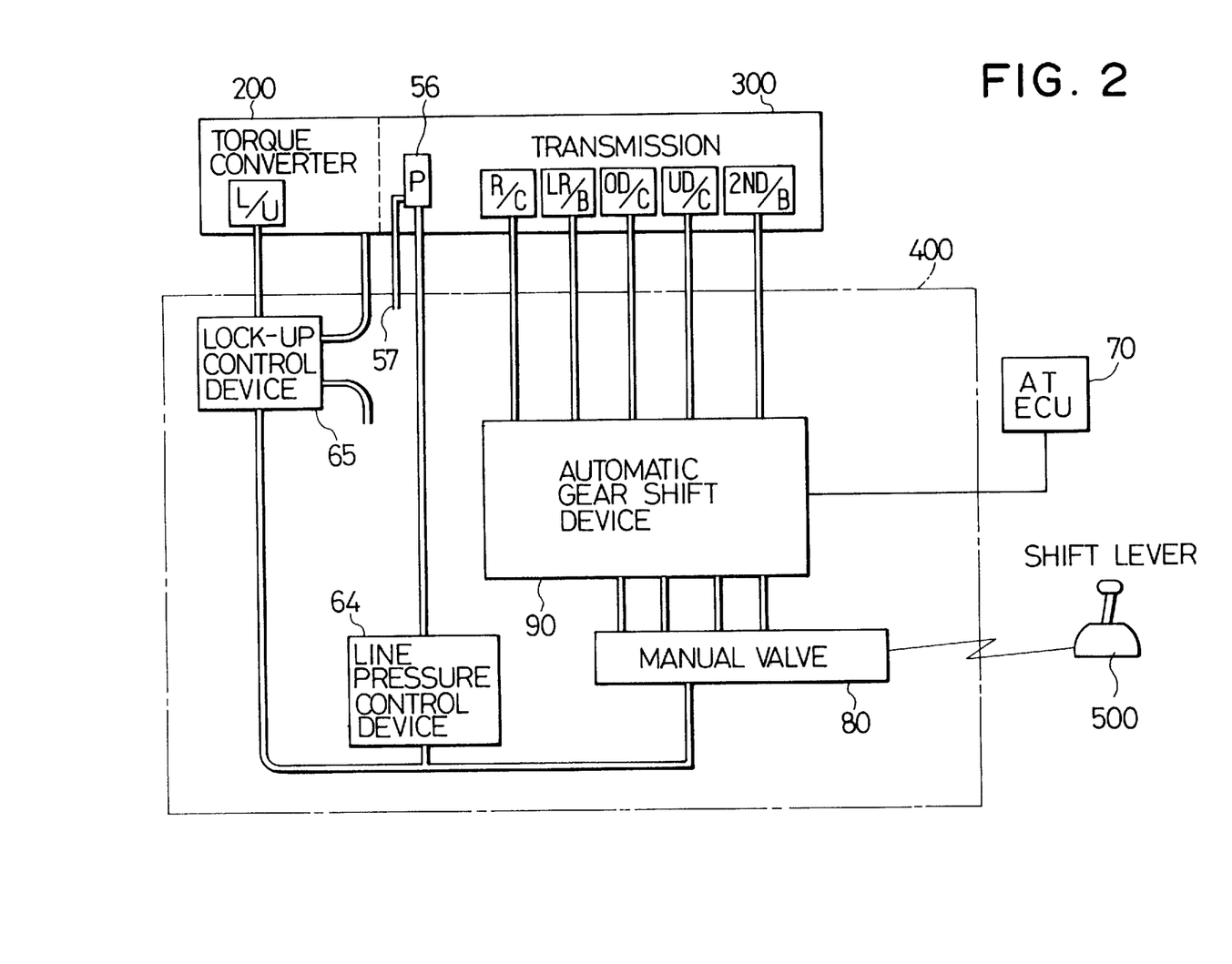
FIG. 2 is a block diagram illustrating a system configuration of an automatic transmission of the first embodiment.

FIG. 1 shows a hydraulic pressure control apparatus for an automatic transmission according to a first embodiment of the present invention, which is applied to an automatic transmission (hereinafter, referred to as "AT") of a vehicle.

In the automatic transmission, rotational speed of an engine is conveyed to a transmission via a fluid coupling device such as a torque converter. The transmission changes rotational speed of the engine by a plurality of planetary gear units disposed therein to adjust torque generated by the engine.

The operation of the automatic transmission for the vehicle is, as well known, that friction coupling of the planetary gear units are switched over by a manual or automatic operation and torque generated by the engine (not illustrated) is conveyed to front or rear wheels via a torque converter 200. An automatic gear shift device 90 and the peripheral circuit thereof, i.e., a hydraulic pressure control device 400 is disposed inside an oil pan (not shown) provided in the lower part of a transmission 300. The inside of the oil pan is a drain of a hydraulic circuit for the torque converter 200 and the transmission 300.

A well-known hydraulic pump 56 which is directly connected with a rotational shaft of the engine and thereby is driven by the engine is provided in the transmission 300. The hydraulic pump 56 takes in hydraulic fluid discharged from several hydraulic devices (a line pressure control device 64, a lock-up control device 65 and the like) to the oil pan, through an intake port 57. Hydraulic fluid pressurized by the hydraulic pump 56 is supplied to the several hydraulic devices via the line pressure control device 64. Although hydraulic fluid from the hydraulic pump 56 fluctuates, the line pressure control device 64 regulates the hydraulic pressure into a constant high line pressure and supplies it to the respective hydraulic devices. Several friction coupling elements are linked with the corresponding gears such as planetary gears, which are disposed in the transmission 300 and have different gear ratios. Therefore, the gear ratio is changed by switching coupling and releasing of the several friction coupling elements. As a result, gear shift control is performed. The lock-up control device adjusts hydraulic pressure applied to an lock-up clutch (L/U).

Figure 4:
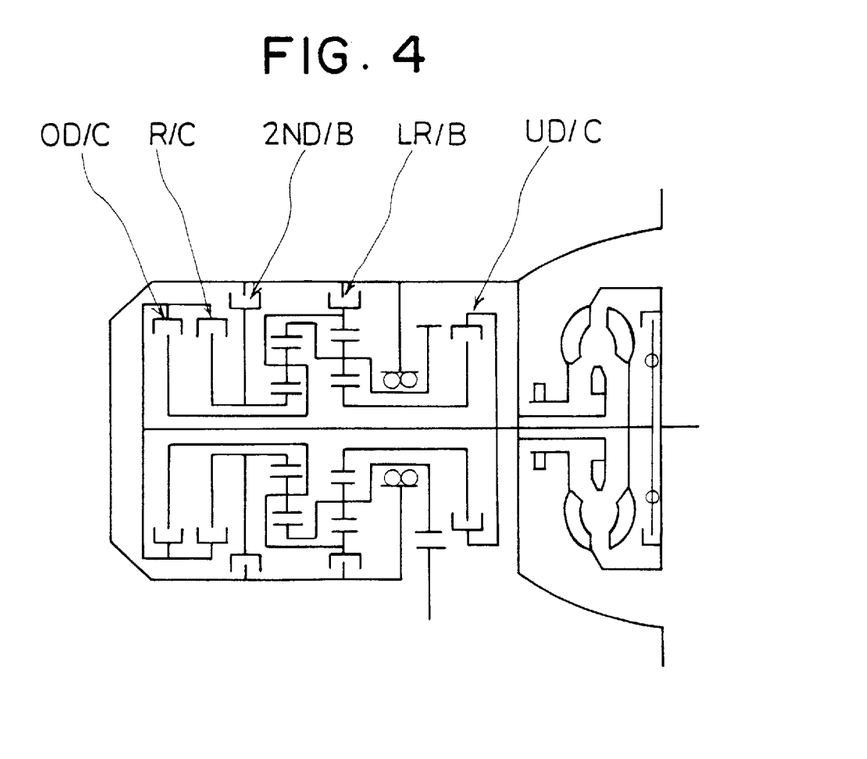
FIG. 4 is a schematic structural diagram illustrating a friction coupling device of the first embodiment.

A hydraulic circuit of the hydraulic pressure control device 400 is shown in FIG. 1. Hydraulic pressure control device 400 includes a manual valve 80, the line pressure control device 64, the lock-up control device 65 and so on. The hydraulic circuit shown in FIG. 1 is for controlling a train of gears illustrated in FIG. 4. The hydraulic control circuit has fail-safe valves 6 and 7 for preventing double coupling in which an input shaft is locked inside the transmission 300. In FIG. 1, an overdrive clutch (OD/C), an underdrive clutch (UD/C), a second brake (2ND/B), a reverse clutch (R/C) and low/reverse brake (LR/B) correspond to the several friction coupling elements.

In FIG. 1, the manual valve 80 has three positions corresponding to three shift ranges. In a forward-movement range (including fourth, third, second and first gear positions), hydraulic conduits B and C are provided with the high line pressure or control pressure and hydraulic conduits A and D are held in low hydraulic pressure. In a neutral range (parking and neutral gear positions), all of the hydraulic conduits A, B, C and D are held in low hydraulic pressure. In a backward-movement range (reverse gear position), the hydraulic conduits A and D are provided with high line pressure or control pressure and the hydraulic conduits B and C are held in low hydraulic pressure. FIG. 1 shows a state of the hydraulic circuit when the forward-movement range is selected.

Figure 3:
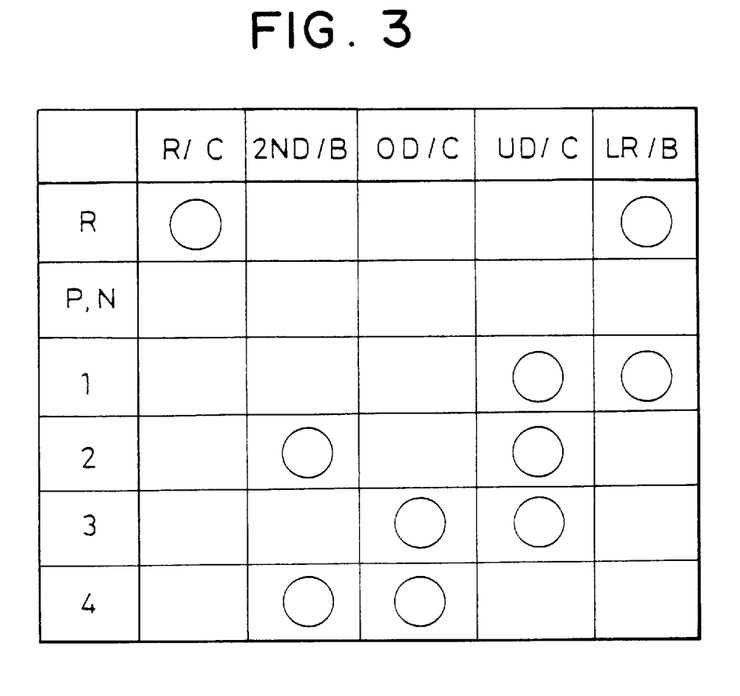
FIG. 3 is a table illustrating a relationship between gear positions and coupling states or releasing states of friction coupling elements.

By switching over the manual valve 80 and controlling output hydraulic pressure of solenoid valves 2, 3, 4 and 5, the clutches and the brakes which are the friction coupling elements are selectively coupled or released as shown in FIG. 3. As a result, a desired gear position (gear ratio) can be achieved. In FIG. 3, a symbol ○ represents a coupling state of the corresponding friction coupling element and a blank space represents a releasing state thereof. The solenoid valve 3 which is an electro-hydraulic control valve corresponds to the second control device and the solenoid valve 5 which is also an electro-hydraulic control valve corresponds to the first control device.

Figure 5:
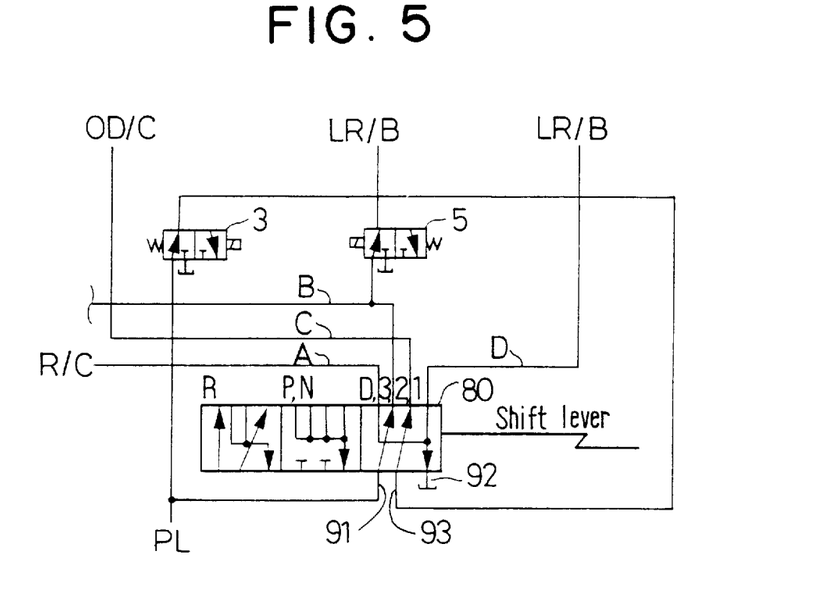
FIG. 5 is a schematic diagram illustrating an operation of the hydraulic pressure control device during forward-movement of a vehicle.
Figure 6:
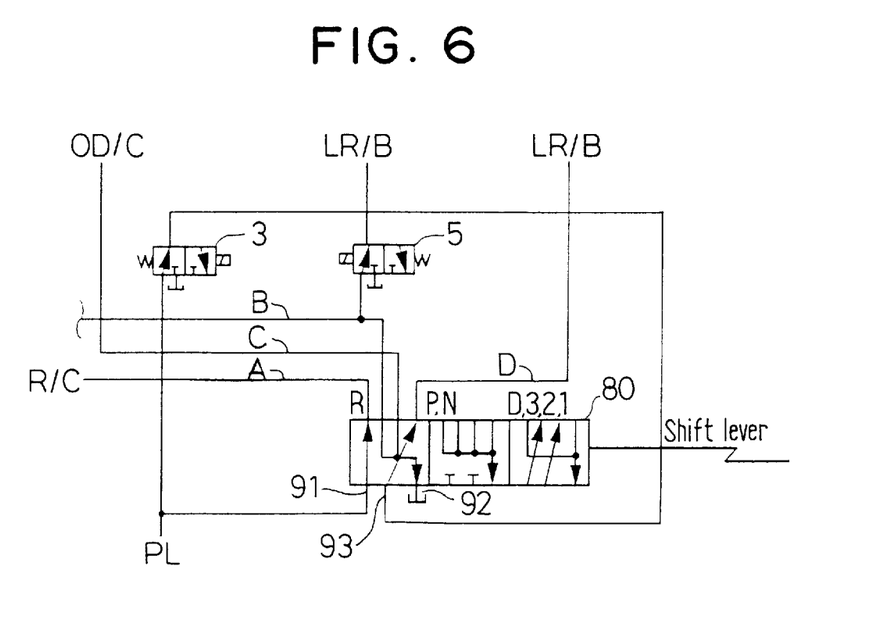
FIG. 6 is a schematic diagram illustrating an operation of the hydraulic pressure control device during backward-movement of a vehicle.

Switching over of the manual valve 80 in accordance with the shift range will be described with reference to FIGS. 1, 5 and 6. FIG. 5 shows a state of the manual valve 80 in the forward-movement range. FIG. 6 shows a state of the manual valve 80 in the backward-movement range.

In the forward-movement range shown in FIGS. 1 and 5, output hydraulic pressure of the solenoid valve 5 is applied to LR/B as a first friction coupling element via the fail-safe valve 7 and a logic valve 10. The hydraulic conduit B connected to the solenoid valve 5 is supplied with line pressure PL from a port 91 through the manual valve 80. The hydraulic conduit D connects to a drain 92 through the manual valve 80. Consequently, hydraulic pressure applied to the LR/B can be controlled by regulating the line pressure PL by the solenoid valve 5.

The hydraulic conduit C connects to the OD/C as the second friction coupling element. The output hydraulic pressure of the solenoid valve 3 is supplied to the hydraulic conduit C from a port 93 through the manual valve 80. Because the line pressure PL is applied to the solenoid valve 3, hydraulic pressure applied to the OD/C can be controlled by regulating the line pressure PL by the solenoid valve 3.

The UD/C is subject to hydraulic pressure which is higher between output hydraulic pressure of the solenoid valve 4 and hydraulic pressure of a hydraulic conduit E due to a logic valve 9. The solenoid valve 4 is connected to the hydraulic conduit B to which the line pressure PL is supplied. The hydraulic conduit E connects to a drain through a switching-over valve 11. Therefore, hydraulic pressure applied to the UD/C can be controlled by regulating the line pressure PL by the solenoid valve 4.

Output hydraulic pressure of a solenoid valve 2 is applied to the 2ND/B through the fail-safe valve 6. Because the line pressure PL is applied to the solenoid valve 2 through the hydraulic conduit B, hydraulic pressure applied to the 2ND/B can be controlled by regulating the line pressure PL by the solenoid valve 2.

A hydraulic conduit A connected to the R/C communicates with the drain 92 through the manual valve 80. Therefore, in the forward-movement range, hydraulic pressure applied to the R/C is constantly held in low hydraulic pressure.

In the forward-movement range, first, second, third and fourth gear positions can be realized as shown in FIG. 3 by regulating hydraulic pressure applied to each of the 2ND/B, OD/C, UD/C, and LR/B by the solenoid valves 2, 3, 4 and 5.

To explain more concretely, the first gear position can be obtained when output hydraulic pressure of the solenoid valves 4 and 5 is regulated into high hydraulic pressure (coupling pressure) and output hydraulic pressure of the solenoid valves 2 and 3 is regulated into low hydraulic pressure (releasing pressure).

When shifting from the first gear position to the second gear position, while output hydraulic pressure of the solenoid valve 4 is held in high hydraulic pressure, output hydraulic pressure of the solenoid valve 2 is changed to high hydraulic pressure and output hydraulic pressure of the solenoid valve 5 is changed to low hydraulic pressure.

When shifting from the second gear position to the third gear position, while output hydraulic pressure of the solenoid valve 4 is held in high hydraulic pressure, output hydraulic pressure of the solenoid valve 3 is changed to high hydraulic pressure and output hydraulic pressure of the solenoid valve 2 is changed to low hydraulic pressure.

When shifting from the third gear position to the fourth gear position, while output hydraulic pressure of the solenoid valve 3 is held in high hydraulic pressure, output hydraulic pressure of the solenoid valve 2 is changed to high hydraulic pressure and output hydraulic pressure of the solenoid valve 4 is changed to low hydraulic pressure.

In the backward-movement range, because the hydraulic conduits B and C are communicated with the drain 92 through the manual valve 80, output hydraulic pressure of the solenoid valves 2, 4 and 5 is low hydraulic pressure. Therefore, hydraulic pressure applied to the 2ND/B, OD/C and UD/C is also low hydraulic pressure. However, the hydraulic conduit D communicates with the port 93 through the manual valve 80. The port 93 communicates with the solenoid valve 3 to which the line pressure PL is applied. Consequently, in the backward-movement range, high hydraulic pressure can be provided to the LR/B by driving the solenoid valve 3 instead of the solenoid valve 5. In the meantime, because the hydraulic conduit A communicates with the port 91 subject to the line pressure PL through the manual valve 80, hydraulic pressure applied to the R/C is constantly high in the backward-movement range. Therefore, the reverse gear position is selected.

Figure 7:
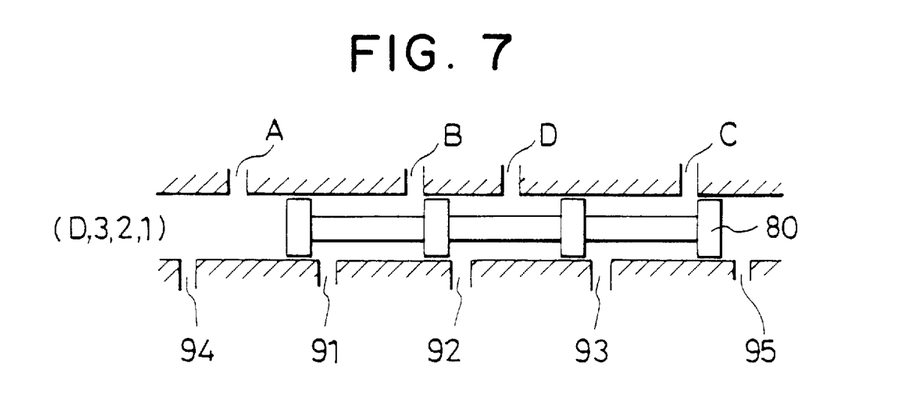
FIG. 7 is a schematic sectional view illustrating an operation of a manual valve when one of forward gears is selected.
Figure 8:
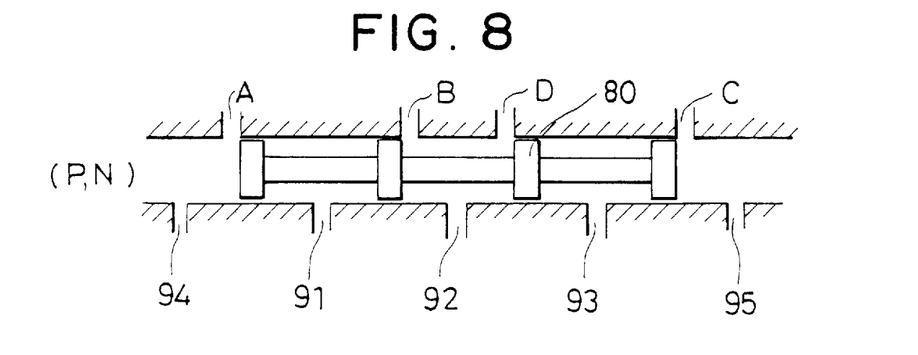
FIG. 8 is a schematic sectional view illustrating an operation of a manual valve when a neutral gear is selected.
Figure 9:
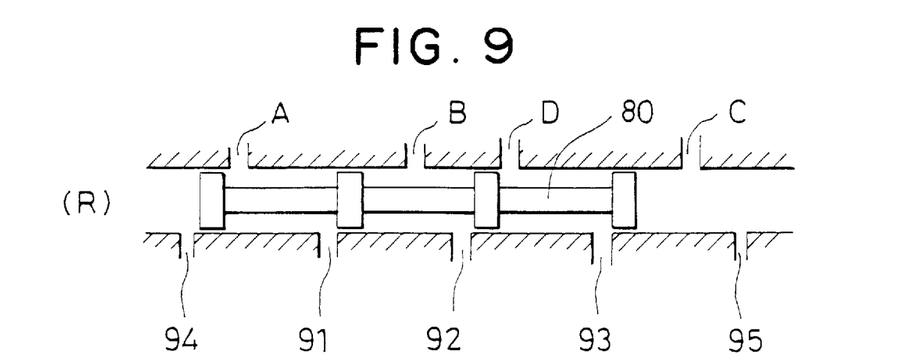
FIG. 9 is a schematic sectional view illustrating an operation of a manual valve when a backward gears is selected.

A detailed structure of the manual valve 80 is shown in FIGS. 7, 8 and 9. FIG. 7 shows a state of the manual valve 80 in the forward-movement range. FIG. 8 shows a state of the manual valve 80 in the neutral range. FIG. 9 shows a state of the manual valve 80 in the backward-movement range.

In FIG. 7, a port 91 leads to a conduit subject to the line pressure PL, ports 92, 94 and 95 leads to the drain and a port 93 leads to a conduit to which control pressure of the solenoid valve 3 is applied. The hydraulic conduits A, B, C and D communicate with the ports 94, 91, 93 and 92, respectively.

In the neutral range shown in FIG. 8, the manual valve 80 moves leftward from the position shown in FIG. 7. As a result, all of the hydraulic conduits A to D communicate with the drain.

In the backward-movement shown in FIG. 9, the manual valve 80 moves further leftward from the position shown in FIG. 8. As a result, the hydraulic conduit A communicates with the port 91 and the hydraulic conduit D communicate with the port 93. Both the hydraulic conduits B and C communicate with the drain.

Figure 10:
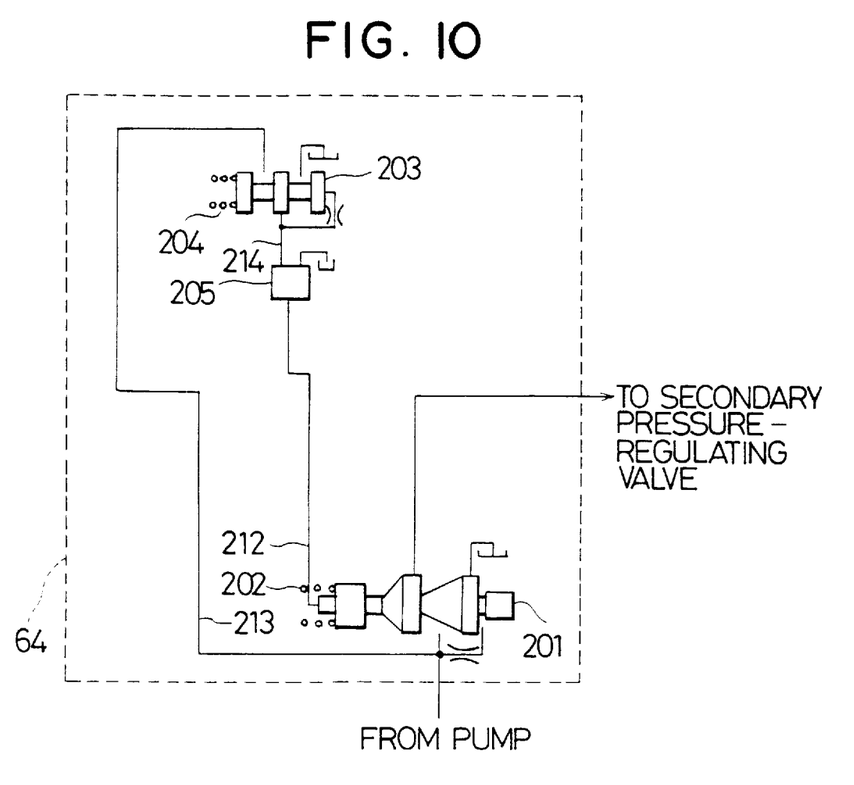
FIG. 10 is a schematic hydraulic circuit illustrating a line pressure control device of the first embodiment.

As shown in FIGS. 1 and 10, the line pressure control device 64 is composed of a primary pressure-regulating valve 201 for producing the line pressure PL, a solenoid valve 205 for providing the primary pressure-regulating valve 201 for reference pressure, a pressure-reducing valve 203 for limiting hydraulic pressure of an output conduit 214 to a predetermined pressure or less, and a secondary pressure-regulating valve 220 for producing secondary pressure.

Figure 11:
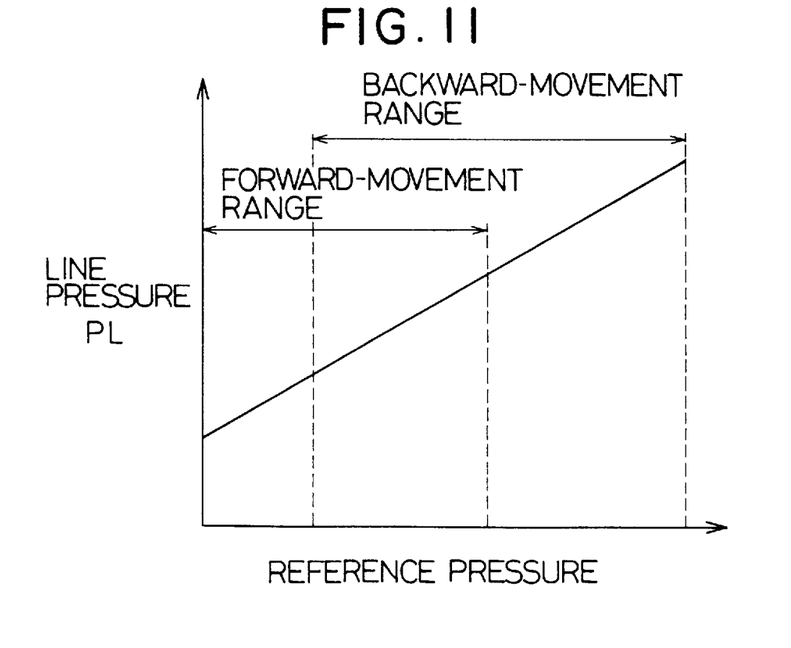
FIG. 11 is a graph illustrating a relationship between a line pressure and a reference pressure in a primary pressure-regulating valve.

The position of the primary pressure-regulating valve 201 is determined based on a balance of hydraulic force caused by hydraulic pressure in a line pressure conduit 213 and the resultant force of biasing force of a spring 202 and hydraulic force caused by hydraulic pressure in a reference pressure conduit 212. Accordingly, the line pressure PL in the line pressure conduit 212 is varied in accordance with the position of the primary pressure-regulating valve 201. As shown in FIG. 11, the line pressure Pl increases in proportion to the rise of hydraulic pressure (reference pressure) of the reference pressure conduit 212. The primary pressure-regulating valve 201 and the secondary pressure-regulating valve 220 are connected through a hydraulic conduit. The secondary pressure-regulating valve 220 produces secondary pressure (source pressure) utilized as an operating hydraulic pressure applied to the lock-up control device 65.

The position of the pressure-reducing valve 203 is determined based on a balance of a biasing force of a spring 204 and hydraulic force caused by hydraulic pressure in the output conduit 214. As a result, hydraulic pressure in the output conduit 214 is limited to the predetermined pressure or less.

The solenoid valve 205 is a three way valve driven by a duty-control signal. The solenoid valve 205 is duty-controlled based on an opening degree of a throttle valve and a shift range and precisely controls hydraulic pressure in the reference pressure conduit 212 from low hydraulic pressure to a maximum reference pressure corresponding to hydraulic pressure in the output conduit 214. Hydraulic pressure in the reference pressure conduit 212 increases as the opening degree of the throttle valve becomes large. Further, hydraulic pressure in the reference pressure conduit 212 is controlled so that a maximum pressure in the backward-movement range is higher than that in the forward-movement range.

Figure 12:
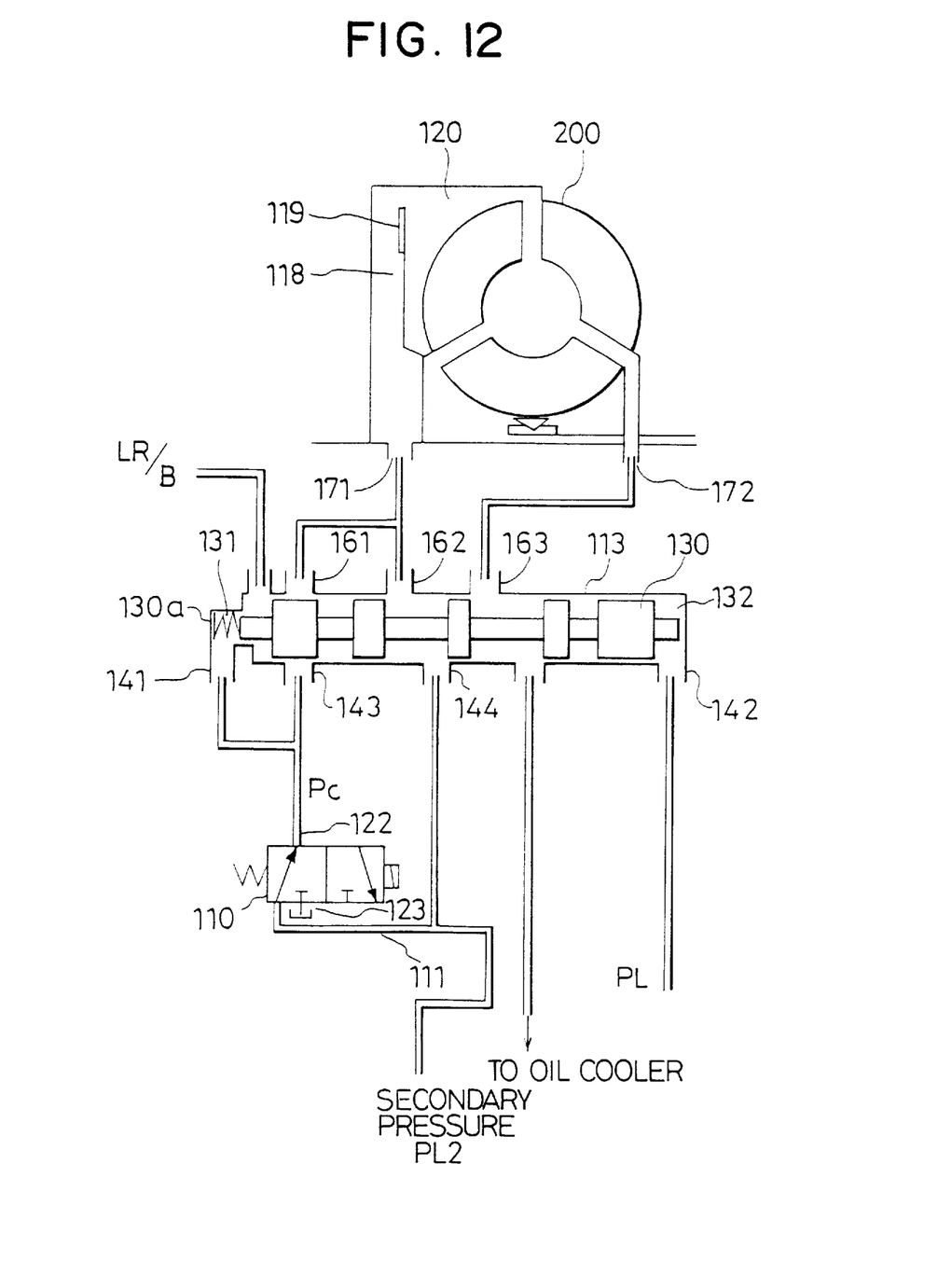
FIG. 12 is a schematic diagram illustrating a lock-up control device for the automatic transmission of the first embodiment.

The lock-up control device 65 is composed of a solenoid valve 110 and a lock-up switching valve 113, as shown in FIG. 12. The solenoid valve 110 is duty-controlled based on a lock-up control signal to render the torque converter 200 into a lock-up state. The solenoid valve 110 is periodically switched between two positions in accordance with the lock-up control signal, so that hydraulic pressure corresponding to the lock-up control signal is generated from the solenoid valve 110. During non-excitation of the solenoid valve 110, a port 111 and a port 122 are communicated therethrough, and the port 122 and a port 123 are interrupted. As a result, the secondary pressure PL2 provided to the port 111 is discharged as a control pressure PC from the port 122. At this time, the control pressure PC is equal to the secondary pressure PL2.

During excitation of the solenoid valve 110, the port 122 and the port 123 are communicated therethrough, and the port 122 and the port 111 are interrupted. As a result, because the port 122 is communicated with a drain, the control pressure PC equivalent to hydraulic pressure in the drain is dischared from the port 122. By repeatedly switching the non-excitation state and the excitation state of the solenoid valve 110 at high speed, the control pressure PC discharged from the port 122 can be controlled to be lower than the secondary pressure PL2. That is, the control pressure PC can be set to be an arbitrary pressure in a range between the secondary pressure PL2 and the drain pressure by controlling a duty ratio of the lock-up control signal.

When the solenoid valve 110 is held into the non-excitation state, because the port 111 and the port 122 are communicated, the control pressure PC equal to the secondary pressure PL2 is discharged from the port 122. As a result, a hydraulic chamber 131 of the lock-up switching value 113 is subject to the secondary pressure PL2 through a port 141. Due to the secondary pressure PL2, a valve member 130 of the lock-up switching valve 113 moves rightward in FIG. 12. As a result, the secondary pressure PL2 is applied to an off port 171 of the torque converter 200 through ports 144 and 162. At this time, hydraulic fluid flows from a clutch control fluid chamber 118 to a torque converter fluid chamber 120, so that a clutch mechanism 119 is released from a lock-up state. In this way, the torque converter 200 becomes a non-lockup state.

When the torque converter 200 is caused to be in the lockup state, the solenoid valve 110 is duty-controlled in accordance with the lock-up control signal. During duty control of the solenoid valve 110, a ratio of an excitation period and a non-excitation period of the solenoid valve 110 is controlled so that the control pressure PC discharged from the port 122 becomes lower than the secondary pressure PL2, as described before. When the control pressure PC lowers due to duty control of the solenoid valve 110, hydraulic force caused by the line pressure PL applied to a hydraulic chamber 132 of the lock-up switching valve 113 through a port 142 becomes greater than the resultant force of the biasing force of the spring 130a and hydraulic force caused by control pressure PC applied to the hydraulic chamber 131. As a result, the valve member 130 of the lock-up switching valve 113 moves leftward in FIG. 12. At this time, because a port 143 and a port 161 of the lock-up switching valve 113 are communicated, the control pressure PC generated by the duty-controlled solenoid valve 110 is applied to the clutch control fluid chamber 118 through the off port 171. Simultaneously, because the port 144 and the port 163 of the lock-up switching valve 113 are communicated, the secondary pressure PL2 is applied to the torque converter fluid chamber 120 of the torque converter 200 through an on port 172. As a result, because hydraulic pressure in the clutch control fluid chamber 118 is equal to the control pressure PC, the lock-up clutch mechanism 119 is driven to a medium position in response to a pressure difference between the control pressure PC and the secondary pressure PL2 provided in the torque converter fluid chamber 120. As a result, so-called slip control of the clutch mechanism 119 is performed. A slip state of the clutch mechanism 119 is adjusted by duty control of the solenoid valve 110. If the control pressure PC provided in the clutch control fluid chamber 118 is gradually reduced, the clutch mechanism 119 is driven to be completely fastened. In this way, the torque converter 200 becomes the lock-up state.

Next, the operation of the hydraulic pressure control device 400 will be described when the several solenoid valves fall into non-excitation states due to breaking of electric signal lines connected thereto, a fail of the AT ECU 70 or the like.

In the forward-movement range, when solenoid valves 2, 3, 4 and 5 fall into non-excitation states, each of the solenoid valves 2, 3, 4 and 5 is biased only by a spring disposed therein. As a result, output hydraulic pressure of each of the solenoid valves 2, 3, 4 and 5 continues to discharge either low hydraulic pressure or high hydraulic pressure. Because the solenoid valve 2 is connected to the drain when being biased by the spring, the output hydraulic pressure of the solenoid valve 2 becomes low hydraulic pressure. As a result, the 2ND/B is supplied with low hydraulic pressure from the solenoid valve 2. Therefore, the 2ND/B is turned into a releasing state.

Because the solenoid valve 3 is connected to a conduit subject to the line pressure PL when being biased by the spring, the output hydraulic pressure of the solenoid valve 3 constantly becomes high hydraulic pressure. High hydraulic pressure from the solenoid valve 3 is applied to the OD/C through the port 93, manual valve 80 and hydraulic conduit C. As a result, the OD/C is turned into a coupling state.

The solenoid valve 4 is connected to the hydraulic conduit B when being biased only by the spring. Because the hydraulic conduit B is provided with the line pressure PL through the manual valve 80, output hydraulic pressure of the solenoid valve 4 becomes high hydraulic pressure. Therefore, the UD/C is supplied with high hydraulic pressure from the solenoid valve 4. As a result, The UD/C is turned into a coupling state.

Because the solenoid valve 5 is connected to a drain when being biased only by the spring, output hydraulic pressure of the solenoid valve 5 becomes low hydraulic pressure. In addition, because the hydraulic conduit D is connected to the drain through the manual valve 80, the LR/B is supplied with low hydraulic pressure. As a result, the LR/B is turned into a releasing state.

Due to the hydraulic pressure distribution as described above, the third gear position is selected even when the several solenoid valves 2, 3, 4 and 5 fall into non-excitation states. Therefore, the vehicle can perform the forward movement.

When the backward-movement range is selected by the manual valve 80 interlocked with the shift lever, because hydraulic pressure in the hydraulic conduits B and C becomes low, the 2ND/B, OD/C and UD/C are turned into the releasing states. On the other hand, because the line pressure PL is applied to the hydraulic conduits A and D, the R/C and LR/B are turned into the coupling states. Therefore, the vehicle can move backward.

In the first embodiment described above, hydraulic pressure applied to the LR/B is controlled by the solenoid valve 5 when the forward-movement range is selected, and is controlled by the solenoid valve 3 when the backward-movement range is selected. In addition, in the forward-movement range, the solenoid valve 3 controls hydraulic pressure applied to the OD/C which couples at a different gear position from the LR/B.

Switching over of hydraulic fluid passages for the forward-movement range and the backward-movement range is reliably executed by the manual valve 80 which is interlocked with the shift lever and is mechanically driven by the shift lever. When the solenoid valves 3 and 5 fall into the non-excitation states due to the breaking of the electric signal line, the failure of the AT ECU 70 or the like, the output hydraulic pressures of the solenoid valves 3 and 5 are held to be high and low, respectively. Therefore, even if the solenoid valves 3 and 5 fall into the non-excitation states, the double coupling of the LR/B and the OD/C can be prevented in the forward-movement range as well as a predetermined gear position can be established in each of the forward-movement range and the backward-movement range. Moreover, prevention of the double coupling and establishment of the predetermined gear position can be executed without increasing the number of the solenoid valves.

The output hydraulic pressure of the solenoid valve 2 which is provided to the fail-safe valve 6, and the output hydraulic pressure of the solenoid valve 5 which is provided to the fail-safe valve 7 are held to the low hydraulic pressure, when the solenoid valve falls into the non-excitation state. Therefore, if the fail-safe valve 6 or 7 has locked, hydraulic pressure applied to the 2ND/B becomes low regardless of the movement range determined by the manual valve 80, and hydraulic pressure applied to the LR/B becomes low when the forward-movement range is selected and becomes high when the backward-movement range is selected. As a result, even if the fail-safe valves 6 and 7 have locked during non-excitation states of the several solenoid valves, the third gear position or the reverse gear position is selected depending on the movement range of the manual valve 80, without occurrence of the double coupling. Therefore, the forward-movement and the backward-movement of the vehicle becomes possible even during the non-excitation states of the several solenoid valves.

What is claimed is:

1. A hydraulic pressure control apparatus for an automatic transmission which comprises a first friction coupling element which is set into a coupling state when a vehicle moves forward and backward and a second friction coupling element which is set into a coupling state when the vehicle moves forward with a gear position different from that when the first friction coupling element is coupled, said hydraulic pressure control apparatus comprising;

a first pressure control device for controlling hydraulic pressure applied to said first friction coupling element, said first pressure control device providing low hydraulic pressure during its non-operated state;

a second pressure control device for controlling hydraulic pressure applied to said second friction coupling element, said second pressure control device providing high hydraulic pressure during its non-operated state; and a changing device for changing a hydraulic pressure supplying source for said first friction coupling element from said first pressure control device to said second pressure control device when the vehicle moves backward.

2. A hydraulic pressure control apparatus for an automatic transmission according to claim 1, wherein said changing device is a manual valve interlocking with a shift lever.

3. A hydraulic pressure control valve for an automatic transmission according to claim 1, wherein said first and second pressure control device are electrohydraulic control valves.

4. An automatic transmission control apparatus comprising:

a first friction coupling element which is set into a coupling state when shifting a gear position of an automatic transmission to a first predetermined position for a forward-movement of a vehicle and a reverse gear position for a backward-movement of the vehicle;

a second friction coupling element which is set into a coupling state when shifting the gear position to a second predetermined position for the forward-movement of the vehicle;

a hydraulic pressure generating source for generating high hydraulic pressure;

a drain for accumulating hydraulic fluid;

a first pressure control valve disposed between said first friction coupling element and both said hydraulic pressure generating source and said drain, for providing said first friction coupling element with high hydraulic pressure for turning the first friction coupling element into the coupling state when the vehicle moves forward and with a hydraulic pressure in said drain when said vehicle moves backward, said first pressure control valve communicating said first friction coupling element and said drain when falling into a non-operated state;

a second pressure control valve connected to both said hydraulic pressure generating source and the drain, for generating hydraulic pressure regulated in a range between said high hydraulic pressure from said hydraulic pressure generating source and hydraulic pressure in said drain, said second pressure control valve generating said high hydraulic pressure when falling into a non-operated state; and a communication switching valve disposed between said second pressure control valve and both said first and second friction coupling elements, which communicates said second pressure control valve with said first friction control valve to turn into the coupling state when the vehicle moves backward and communicates said second pressure control valve with said second friction control valve to turn into the coupling state when the vehicle moves forward.

5. An automatic transmission control apparatus according to claim 4, further comprising:

a selecting valve disposed between said first friction coupling element and both said first and second pressure control valves, which selects higher hydraulic pressure among hydraulic pressures supplied from the first and second pressure control valves and provides the first friction coupling element with said higher hydraulic pressure.

\* \* \* \* \*